United States Patent [19]
Nix

[11] Patent Number: 5,136,888
[45] Date of Patent: Aug. 11, 1992

[54] MECHANISM FOR CONVERTING OSCILLATORY ROTATION OF INPUT SHAFT TO UNIDIRECTIONAL ROTATION OF OUTPUT SHAFT

[75] Inventor: Robert J. Nix, Algonquin, Ill.

[73] Assignee: Signode Corporation, Glenview, Ill.

[21] Appl. No.: 688,469

[22] Filed: Apr. 22, 1991

[51] Int. Cl.$^5$ .......................... F16H 27/02; G05G 5/06
[52] U.S. Cl. .......................................... 74/88; 74/143; 74/531; 74/810.1
[58] Field of Search ................. 74/88, 142, 143, 810.1, 74/531

[56] References Cited

U.S. PATENT DOCUMENTS

| | | | |
|---|---|---|---|
| 167,194 | 8/1875 | Pelton | 74/143 |
| 832,077 | 10/1906 | Pearce | 74/810.1 X |
| 1,197,013 | 9/1916 | Cummings | 74/810.1 |
| 4,825,512 | 5/1989 | Tremper et al. | 24/20 EE |

FOREIGN PATENT DOCUMENTS

| | | | |
|---|---|---|---|
| 746302 | 11/1933 | France | 74/143 |
| 56-3348 | 1/1981 | Japan | 74/810.1 |
| 618630 | 7/1978 | U.S.S.R. | 74/810.1 |

OTHER PUBLICATIONS

Grafstein et al., Pictorial Handbook of Technical Devices, Chemical Publishing Co., Inc. New York (1971) pp. 60-61.

Primary Examiner—Allan D. Herrmann
Assistant Examiner—David W. Laub
Attorney, Agent, or Firm—T. W. Buckman; D. J. Breh

[57] ABSTRACT

In a mechanism for converting oscillatory rotation of an input shaft to unidirectional rotation of an output shaft, two bevel gears are mounted around the input shaft and a bevel gear intermeshed therewith is coupled to the output shaft. Each bevel gear mounted around the input shaft can be alternately coupled to and uncoupled from the input shaft via an associated pawl disposed in a socket in the input shaft and biased toward an operative position wherein such pawl is extended into a single recess in a bearing surface of such bevel gear. Paired pawls and paired recesses may be optionally employed where high torque is encountered. Oscillatory rotation of the input shaft is limited to a range of approximately 180° between two limiting positions. Camming surfaces on the pawls and the gears respectively provide for movement of each pawl from its operative position.

13 Claims, 4 Drawing Sheets

MECHANISM FOR CONVERTING OSCILLATORY ROTATION OF INPUT SHAFT TO UNIDIRECTIONAL ROTATION OF OUTPUT SHAFT

TECHNICAL FIELD OF THE INVENTION

This invention pertains to an improved mechanism for converting oscillatory rotation of an input shaft to unidirectional rotation of an output shaft. The improved mechanism can be advantageously employed in a strapping tool of a type having an actuating handle arranged to be manually oscillated.

BACKGROUND OF THE INVENTION

In a strapping tool of a type used to apply a steel strap in a tensioned loop around a package and to join the strap via a series of interlocking joints comprising interlockable shoulders punched into overlapped ends of the strap, an actuating handle is provided, which is arranged to be manually oscillated. The handle rotates an output shaft, which actuates a series of cams, via an input shaft, to which the handle is coupled, and intermediate gears. The cams drive a series of punches, which punch interlockable shoulders into overlapped ends of the strap. Tremper et al. U.S. Pat. No. 4,825,512 provides a recent example of such a strap having such a series of interlocking joints.

Moreover, in a strapping tool of the type above, a mechanism is provided for converting oscillatory motion of the actuating handle to unidirectional rotation of the output shaft. Typically, heretofore, the converting mechanism has employed a unidirectional clutch to couple the handle to the input shaft upon forward motion of the handle and to decouple the handle from the input shaft upon reverse motion of the handle. Thus, reverse motion of the handle has been unproductive, except to reset the handle for forward motion. Typically, moreover, two strokes of forward motion of the handle have been required to provide one complete rotation of the output shaft for one complete stroke of the punches.

A mechanism employing bevel gears and ratchet wheels for converting oscillatory rotation of an input shaft to unidirectional rotation of an output shaft is known. Such a mechanism is exemplified in Grafstein et al., *Pictorial Handbook of Technical Devices,* Chemical Publishing Co., Inc., New York (1971) at pages 60 and 61. However, if it were employed in a strapping tool of the type noted above, such a mechanism would not be entirely satisfactory. Such a mechanism does not limit oscillatory rotation of the input shaft to any specific range and does not limit unidirectional rotation of the output shaft to any specific range. In a strapping tool of the type noted above, however, it is desirable to limit oscillatory rotation of the input shaft to a specific range (e.g. approximately 180°) and to limit unidirectional rotation of the output shaft to one complete rotation in each operating cycle.

SUMMARY OF THE INVENTION

This invention provides an improved mechanism for converting oscillatory rotation of an input shaft to unidirectional rotation of an output shaft. The improved mechanism limits oscillatory rotation of the input shaft to a specific range and limits unidirectional rotation of the output shaft to one complete rotation in each operating cycle so as to be particularly useful in a strapping tool of the type noted above. The improved mechanism has other uses, as in a winding apparatus, such as a winch.

The improved mechanism comprises a frame, to which the input and output shafts are journalled. The input shaft defines an input axis, about which it is rotatable. The output shaft defines an output axis, about which it is rotatable. Preferably, the input shaft is rotatable only between two limiting positions. The output axis is normal to the input axis.

The improved mechanism comprises bevel gears. These gears include a first gear mounted around the input shaft so as to permit relative rotation between the first gear and the input shaft, a second gear mounted around the input shaft so as to permit relative rotation between the second gear and the input shaft, and a third gear coupled to the output shaft so as to enable conjoint rotation of the third gear and the output shaft. The first and second gears are spaced from each other along the input shaft. The third gear is intermeshed with each of the first and second gears. In a preferred construction, each of the first and second gears has a bearing surface, which is smooth except for a single recess of each gear, namely a first recess, of the first gear, and a second recess, of the second gear.

The improved mechanism comprises a first pawl, which is movable between an operative position and an inoperative position. In the preferred construction, such pawl is carried by the input shaft in a manner permitting such pawl to move therebetween. The first pawl is biased toward its operative position. Thus, in the preferred construction, such pawl extends into the first recess in the operative position of such pawl. Also, in the preferred construction, such pawl is withdrawn from such recess in the inoperative position of such pawl. The first pawl couples the first gear to the input shaft so as to enable conjoint rotation of the first gear and the input shaft in the operative position of the first pawl. Thus, if the input shaft is rotatable only between two limiting positions, the first pawl enables conjoint rotation thereof only with rotation of the input shaft toward one such limiting position. The first pawl decouples the first gear from the input shaft so as to permit relative rotation between the first gear and the input shaft in the inoperative position of the first pawl. In the preferred construction, as biased toward its operative position, the first pawl is biased against the bearing surface of the first gear so as to permit relative movement between the first gear and the first pawl except in the operative position of the first pawl.

The improved mechanism comprises a second pawl, which is movable between an operative position and an inoperative position. In the preferred construction, such pawl is carried by the input shaft in a manner permitting such pawl to move therebetween. The second pawl is biased toward its operative position. Thus, in the preferred construction, such pawl extends into the second recess in the operative position. Also, in the preferred construction, such pawl is withdrawn from such recess in the inoperative position. The second pawl couples the second gear to the input shaft so as to enable conjoint rotation of the second gear and the input shaft in the operative position of the second pawl. Thus, if the input shaft is rotatable only between two limiting positions, the second pawl enables conjoint rotation thereof only with rotation of the input shaft toward the other limiting position. The second pawl decouples the second gear from the input shaft so as to permit relative rotation between the second gear and the input shaft in the inoperative position of the second pawl. In the preferred construction, as biased toward its operative position, the second pawl is biased against the bearing surface of the second gear so as to permit relative movement between the second gear and the second pawl except in the operative position of the second pawl.

Preferably, each gear of the first and second gears has a camming surface and the pawl corresponding to such gear has a camming surface, which is disposed so as to engage the camming surface of such gear in the operative position of such pawl. The camming surface of the first gear and the camming surface of the first pawl cam the first pawl from its operative position into its inoperative position upon relative rotation of the first gear and the input shaft in opposite rotational directions. The camming surface of the second gear and the camming surface of the second pawl cam the second pawl from its operative position into its inoperative position upon relative rotation of the second gear and the input shaft in opposite rotational directions. Also, in the preferred construction, the pawl-receiving recess of each gear is bounded partly by the camming surface of such gear.

Preferably, the improved mechanism comprises structure for limiting rotation of the input shaft to rotation within a range of approximately 180 between a first limiting position and a second limiting position. In the first limiting position, the first pawl can move from its inoperative position into its operative position. In the second limiting position, the second pawl can move from its inoperative position into its operative position.

In a preferred arrangement, each gear has a circular, axial aperture, through which a cylindrical portion of the input shaft extends. The axial aperture is bounded by a cylindrical surface constituting the bearing surface of such gear except for the single recess of such gear. Such recess opens into such aperture. Moreover, in the same arrangement, the input shaft has a first, generally radial socket, in which the first pawl is disposed so as to permit generally radial movement of the first pawl between its inoperative position and its operative position. Similarly, in the same arrangement, the input shaft has a second, generally radial socket, in which the second pawl is disposed so as to permit generally radial movement of the second pawl between its inoperative position and its operative position. Preferably, in the same arrangement, a coiled spring in each socket of the input shaft biases the pawl disposed in such socket toward its operative position.

Furthermore, in an alternative arrangement contemplated by this invention, a pair of similar pawls in diametric opposition to each other are associated with each bevel gear mounted to the input shaft. Moreover, each bevel gear mounted to the input shaft has a bearing surface, which is smooth except for a pair of similar recesses in diametric opposition to each other. The alternative arrangement may be advantageously used where high torque is encountered.

These and other objects, features, and advantages of this invention are evident from the following description of a preferred embodiment of this invention, with reference to the accompanying drawings.

DETAILED DESCRIPTION OF PREFERRED EMBODIMENT

Figures 1, 2:
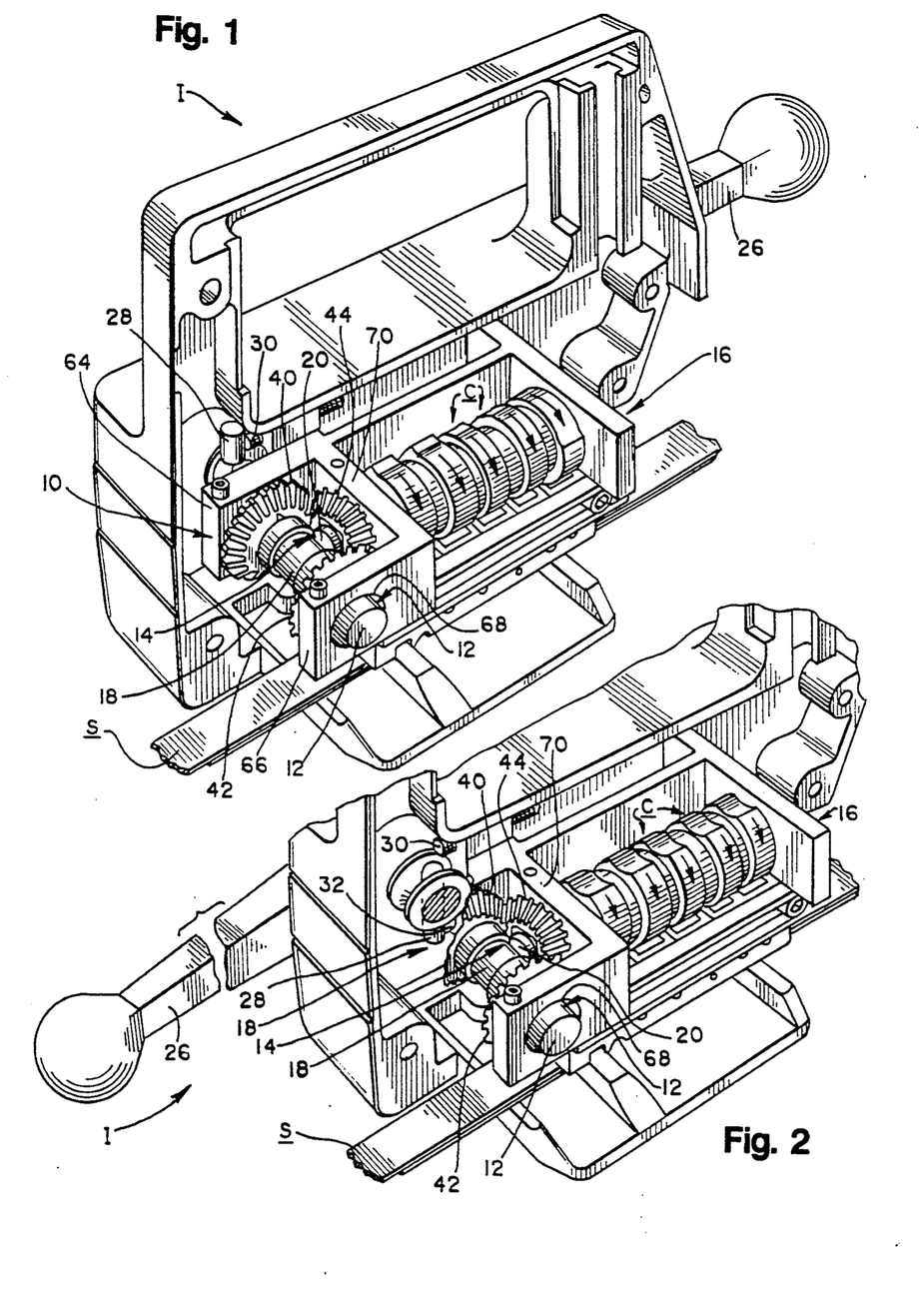
FIG. 1 is a perspective view of a strapping tool employing a preferred embodiment of the improved mechanism provided by this invention for converting oscillatory rotation of an input shaft to unidirectional rotation of an output shaft. An actuating handle of the strapping tool is shown approaching a limit of forward motion of such handle.
FIG. 2 is a fragmentary, perspective view of the strapping tool with the actuating handle being shown as approaching a limit of reverse motion of such handle.

As shown in FIGS. 1 and 2, a mechanism 10 for converting oscillatory rotation of an input shaft 12 to unidirectional rotation of an output shaft 14 constitutes a preferred embodiment of this invention. The mechanism 10 is shown in FIGS. 1 and 2 as employed in a strapping tool T of the type noted above. The strapping tool T comprises a frame 16 for the mechanism 10 and for other elements of the strapping tool T. The input shaft 12, which defines an input axis, is journalled to the frame 16 and is rotatable about the input axis. The output shaft 14, which defines an output axis, is journalled to the frame 16 and is rotatable about the output axis. The output axis is normal to the input axis.

As shown, the input shaft 12 has a recess 18 having a reduced diameter, as compared to adjacent portions of the input shaft 12. The output shaft 14 has a cylindrical end 20, which extends into the recess 18 of the input shaft 12 so as to position the respective shafts 12, 14, relative to each other. The recess 18 is sized so as to confine the cylindrical end 20 but so as to permit the output shaft 14 to rotate without the input shaft 12 imparting frictional drag on the output shaft 14.

The output shaft 14 has another cylindrical end 22, which is similar to the cylindrical end 20, and an intermediate portion 24 having a noncircular cross-section, which may be substantially square with rounded corners, as shown. The output shaft 14 is journalled to the frame via bearings (not shown) at the cylindrical end 18. A series of cams C are mounted on the intermediate portion 24 so as to enable conjoint rotation of the cams C with the output shaft 14. The cams C are arranged to drive a series of punches (not shown) which are arranged to punch interlocking shoulders (not shown) into overlapped ends of a steel strap, such as the strap S shown in FIGS. 1 and 2, so as to join the strap via a series of interlocking joints (not shown) in a known manner. The cams and punches may be substantially similar to the cams and punches employed in known strapping tools of the type noted above.

An actuating handle 26 is secured to the input shaft 12 so that the input shaft 14 is rotated about the input axis as the actuating handle 26 is pivoted about the input axis. The actuating handle 26 is pivotable manually between a first limiting position, in which the actuating handle 26 is shown in FIG. 1, and a second limiting position, in which the actuating handle 26 is shown in FIG. 2. A pin 28 is secured to the input shaft 12 so as to extend radially from such shaft 12. A threaded stud 30, which is secured to the frame 16 so as to extend above the input shaft 12, is disposed to as to engage the pin 28 when the input shaft 12 has been rotated to a position corresponding to the first limiting position of the actuating handle 26. A threaded stud 32, which is secured to the frame 16 so as to extend below the input shaft 12, is disposed so as to engage the pin 28 when the input shaft 12 has been rotated to a position corresponding to the second limiting position of the actuating handle 26. Thus, the first limiting position of the actuating handle 26 defines a first limiting position of the input shaft 12, and the second limiting position of the actuating handle 26 defines a second limiting position of the input shaft 12. Also, the respective studs 30, 32, and the pin 28 coact so as to limit rotation of the input shaft 12 to rotation within a range of approximately 180 between its first limiting position and its second limiting position. Herein, references to forward motion of the actuating handle 26 refer to pivotal motion of the actuating handle 26 toward its first limiting position, and references to reverse motion of the actuating handle 30 refer to pivotal motion of the actuating handle 26 toward its second limiting position.

Figure 3:
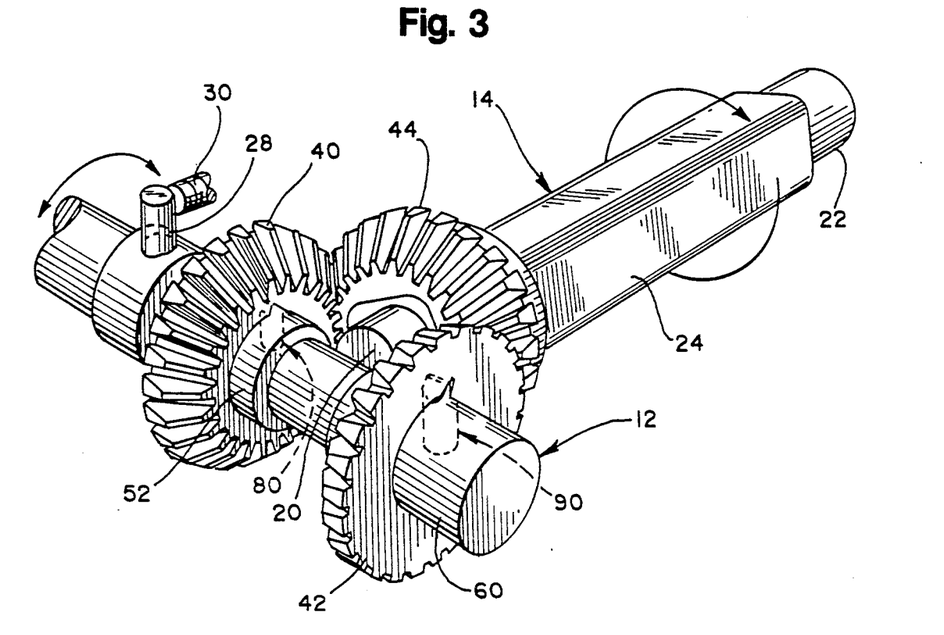
FIG. 3 is a perspective view of certain elements isolated from the strapping tool. The input shaft and the output shaft are shown, along with certain bevel gears, certain pawls, and certain related elements.
Figure 4:
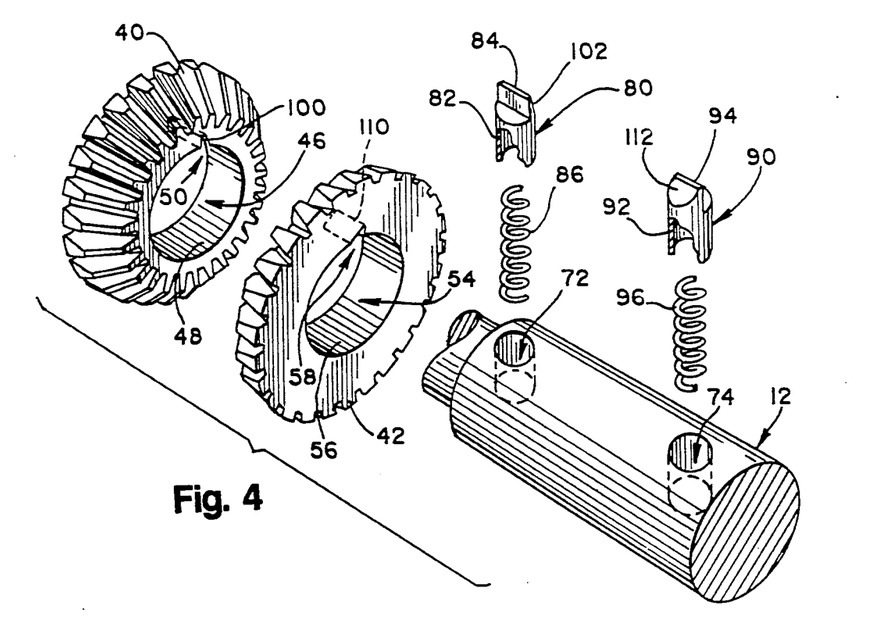
FIG. 4 is an exploded, perspective view of some of the same elements.

The mechanism 10 comprises three bevel gears, namely a first gear 40, a second gear 42, and a third gear 44. Each of the first and second gears 40, 42, is mounted around the input shaft 12 so as to permit relative rotation between such gear and the input shaft 12. Thus, the first gear 40 has a circular, axial aperture 46, which is bounded by a cylindrical bearing surface 48 except for a single recess 50, and through which a cylindrical portion 52 of the input shaft 12 extends. Also, the second gear 42 has a circular, axial aperture 54, which is bounded by a cylindrical bearing surface 56 except for a single recess 58, and through which a cylindrical portion 60 of the input shaft 12 extends. The cylindrical portions 52, 60, of the input shaft 12 are separated by the recess 18. The third gear 44 is coupled to the output shaft 14 so as to enable conjoint rotation of the third gear 44 and the output shaft 14. Thus, the third gear 44 has a noncircular, axial aperture 62, which conforms to the intermediate portion 24 of the output shaft 14, and through which such portion 24 of the output shaft 14 extends, so as to couple the third gear 44 to the output shaft 14, between the series of cams C and the cylindrical end 20 of the output shaft 14. The third gear 44 is intermeshed with the first gear 40 and with the second gear 42.

The frame 16 has a wall 64, which is disposed so as to block the first gear 40 against becoming displaced along the input shaft 12, away from the third gear 44 intermeshed with the first gear 40. The wall 64 has an aperture (not shown) accommodating the cylindrical portion 52 of the input shaft 12. The frame 16 has a wall 66, which is disposed so as to block the second gear 42 against becoming displaced along the input shaft 12, away from the third gear 44 intermeshed with the second gear 42. The wall 66 has an aperture 68 accommodating the cylindrical portion 60 of the input shaft 12. The frame 16 has a wall 70, which is disposed so as to block the third gear 44 against becoming displaced along the output shaft 14, away from the respective gears 40, 42, intermeshed with the third gear 44. The wall 70 has an aperture (not shown) accommodating the intermediate portion 24 of the output shaft 14.

The cylindrical portion 52 of the input shaft 12 has a first, generally radial socket 72, which opens at the cylindrical bearing surface 48 of the first gear 40. The cylindrical portion 60 of the input shaft 12 has a second, generally radial socket 74, which opens at the cylindrical bearing surface 56 of the second gear 42. The respective sockets 72, 74, are similar.

The mechanism 10 includes a first pawl 80, which is carried by the input shaft 12 in a manner permitting such pawl 80 to move between an operative position and an inoperative position. Such pawl 80 has a tubular portion 82, which is disposed within the first socket 72 so as to permit generally radial movement of such pawl 80 between its operative and inoperative positions. Such pawl 80 has an end portion 84, which extends from the first socket 72, into the single recess 50 of the first gear 40, in the operative position of such pawl 80. The end portion 84 is withdrawn from such recess 50 and bears against the cylindrical bearing surface 48 of the first gear 40 in the inoperative position of such pawl 80. A coiled spring 86, which is seated in the first socket 72 so as to extend through the tubular portion 82 and bears against the end portion 84, biases such pawl 80 toward its operative position, against such bearing surface 48 so as to permit relative movement of the first gear 40 and the first pawl 80 except in the operative position of such pawl 80. Thus, in its operative position, the first pawl 80 couples the first gear 40 to the input shaft 12 so as to enable conjoint rotation of the first gear 40 and the input shaft 12 only in a rotational direction (counterclockwise in the drawings) corresponding to rotation of the input shaft 12 toward its second limiting position.

The mechanism 10 includes a second pawl 90, which is carried by the input shaft 12 in a manner permitting such pawl 90 to move between an operative position and an inoperative position. Such pawl 90 has a tubular portion 92, which is disposed within the second socket 74 so as to permit generally radial movement of such pawl 90 between its operative and inoperative positions. Such pawl 90 has an end portion 94, which extends from the second socket 74, into the single recess 58 of the first gear 40, in the operative position of such pawl 90. The end portion 94 is withdrawn from such recess 58 and bears against the cylindrical bearing surface 56 of the second gear 42 in the inoperative position of such pawl 90. A coiled spring 96, which is seated in the second socket 74 so as to extend through the tubular portion 92 and bears against the end portion 94, biases such pawl 90 toward its operative position, against such bearing surface 56 so as to permit relative movement of the second gear 42 and the second pawl 90 except in the operative position of such pawl 90. Thus, in its operative position, the second pawl 90 couples the second gear 42 to the input shaft 12 so as to enable conjoint rotation of the second gear 42 and the input shaft 12 only in a rotational direction (clockwise in the drawings) corresponding to rotation of the input shaft 12 toward its first limiting position.

The first gear 40 has a planar camming surface 100, which partly bounds the first recess 50 of such gear 40. The end portion 84 of the first pawl 80 has a planar camming surface 102, which is disposed so as to engage the camming surface 100 in the operative position of such pawl 80. The camming surfaces 100, 102, coact so as to cam the first pawl 80 from its operative position upon relative rotation of the first gear 40 and the input shaft 12 in opposite rotational directions.

The second gear 42 has a planar camming surface 110, which partly bounds the second recess 58 of such gear 42. The end portion 94 of the second pawl 90 has a planar camming surface 112, which is disposed so as to engage the camming surface 110 in the operative position of such pawl 90. The camming surfaces 110, 112, coact so as to cam the second pawl 90 from is operative position upon relative rotation of the second gear 42 and the input shaft 12 in opposite rotational directions.

Figure 5:
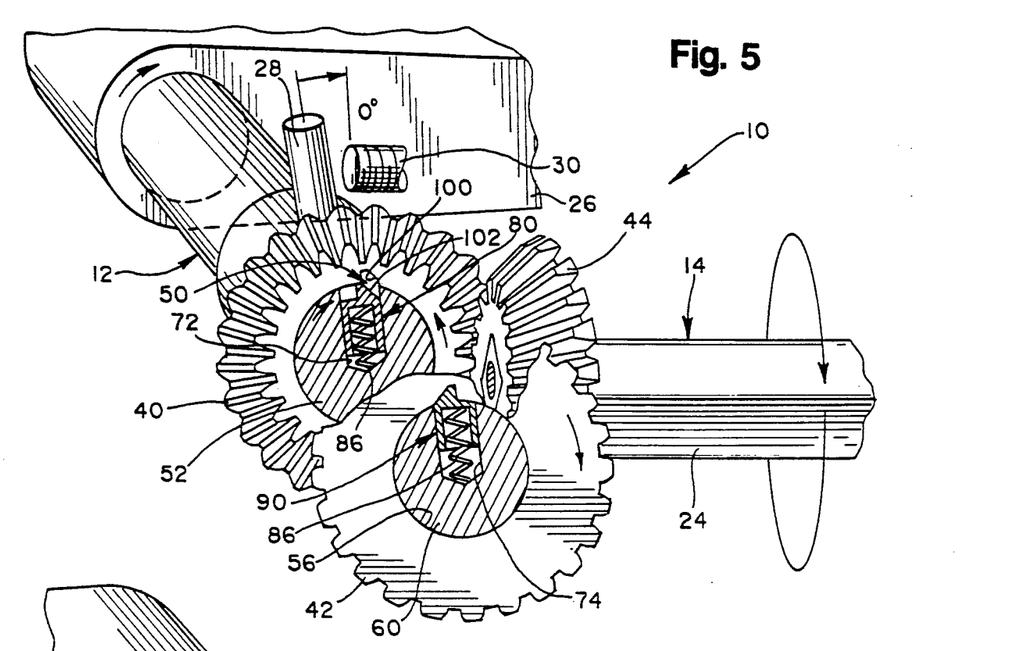
FIGS. 5 and 6 are partly broken away, perspective views showing some of the same elements in two different positions.
Figure 6:
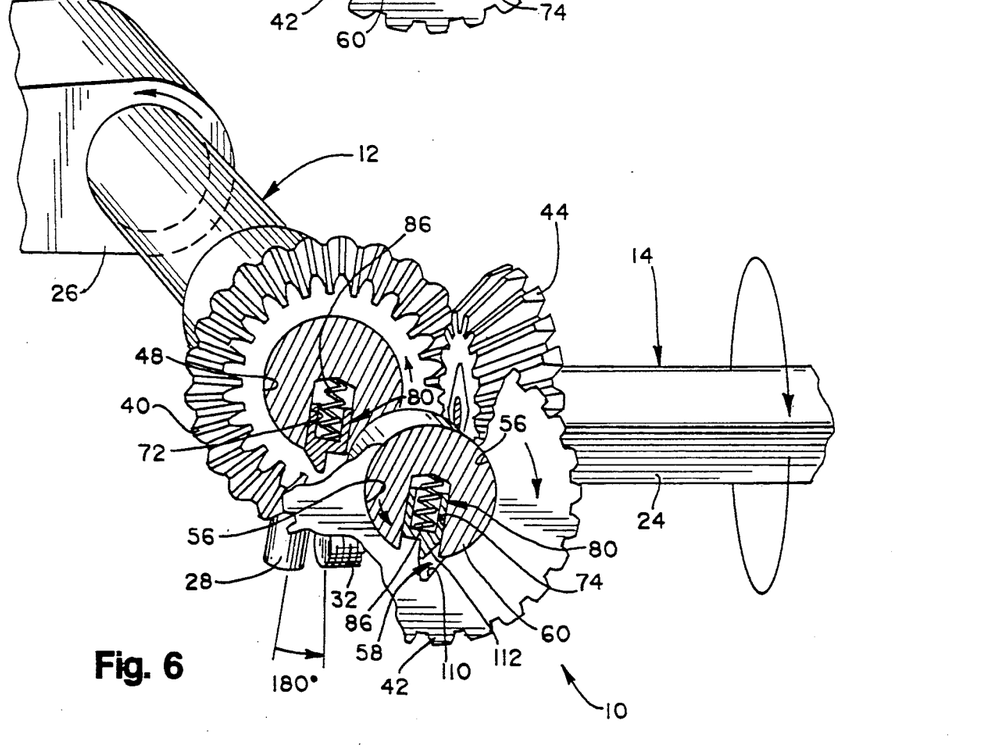

Each operating cycle of the mechanism 10 is produced by oscillatory rotation of the input shaft 12, i.e., by 180° rotation of the input shaft 12 from its second limiting position to its first limiting position, as suggested by curved arrows in FIG. 5, and 180° rotation of the input shaft 12 from its first limiting position to its first limiting position to its second limiting position, as suggested by curved arrows in FIG. 6. Such rotation of the input shaft 12 from its second limiting position to its first limiting position is effected manually by forward motion of the actuating handle 26. Such rotation of the input shaft 12 from its first limiting position to its second limiting position is effected manually by reverse motion of the actuating handle 26. Each operating cycle of the mechanism 10 produces unidirectional rotation of the output shaft 14 for one complete rotation.

As the input shaft 12 is rotated toward its second limiting position upon reverse motion of the actuating handle 26, the first gear 40 and the input shaft 12 are rotated conjointly, as coupled by the first pawl 80, whereas the second gear 42 is rotated oppositely via the third gear 44. While the second gear 42 is rotated oppositely, the end portion 94 of the second pawl 90 is biased against the cylindrical bearing surface 56 of the second gear 42 by the coiled spring 96 and moves along such surface 56. When the input shaft 12 reaches its second limiting position, the end portion 94 of the second pawl 90 can enter the second recess 58 and is urged by the coiled spring 96 into such recess 58. As the input shaft 12 begins to rotate from the second limiting position toward the first limiting position, the first pawl 80 is cammed out of the first recess 50 via the camming surfaces 100, 102.

As the input shaft 12 is rotated toward its first limiting position upon forward motion of the actuating handle 26, the second gear 42 and the input shaft 12 are rotated conjointly, as coupled by the second pawl 90, whereas the first gear 40 is rotated oppositely via the third gear 44. While the first gear 40 is rotated oppositely, the end portion 84 of the first pawl 80 is biased against the cylindrical bearing surface 48 of the first gear 40 by the coiled spring 86 and moves along such surface 48. When the input shaft 12 reaches its first limiting position, the end portion 84 of the first pawl 80 can enter the first recess 50 and is urged by the coiled spring 86 into such recess 50. As the input shaft 12 begins to rotate from the first limiting position toward the second limiting position, the second pawl 90 is cammed out of the second recess 58 by the camming surfaces 110, 112.

Whenever pivotal movement of the actuating handle 26 in a given rotational direction is reversed purposefully or accidentally, with the actuating handle 26 and the output shaft 14 at an intermediate position, the pawl coupling whichever of the first and second gears 40, 42, is coupled to the input shaft 12 is cammed out of the associated recess, if frictional drag imparted to the output shaft 14 is sufficient to overcome the biasing force of the coiled spring associated with such pawl. Usually, in the strapping tool T, frictional drag imparted to the output shaft 14 is sufficient to do so. Once cammed out of the associated recess, the last-mentioned pawl cannot reenter the associated recess unless pivotal movement of the actuating handle 26 in the given rotational direction is resumed and is continued until the actuating handle 26 returns to the intermediate position where pivotal movement of the actuating handle 26 was reversed. This can be a highly desirable enhancement in that full handle movement is required, which results in all associated mechanical functions required to securely join two overlapped ends of a steel strap in a complete, satisfactory manner.

Figure 7:
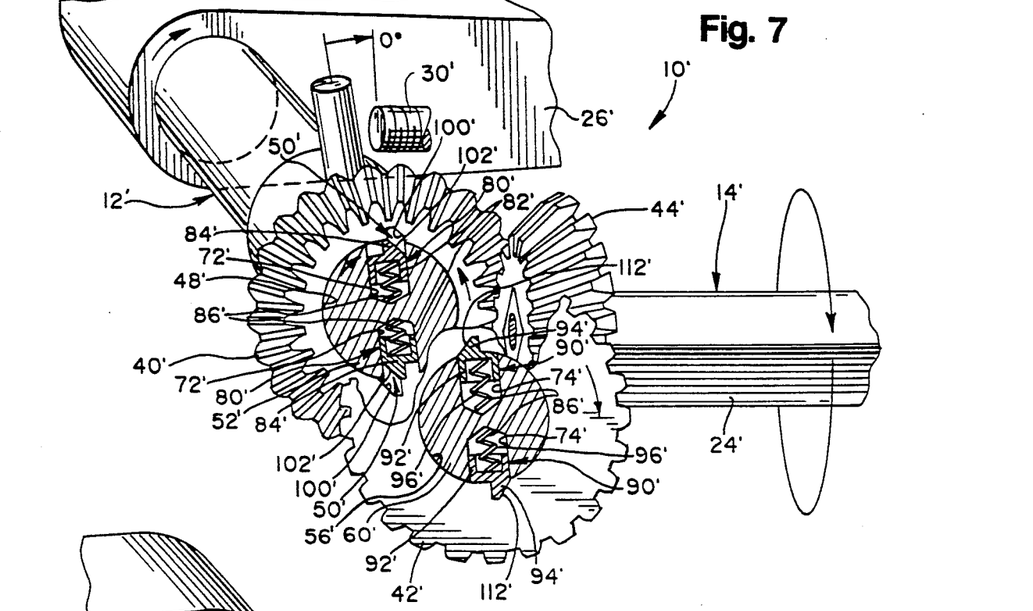
FIGS. 7 and 8 are similar views showing, in two different positions, comparable elements in an alternative embodiment of this invention.
Figure 8:
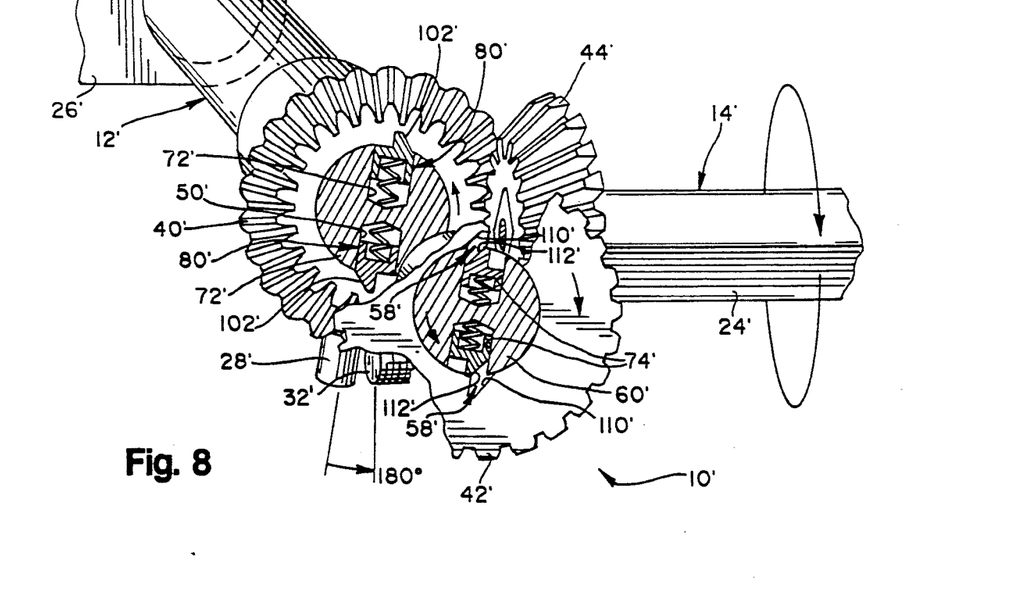

As shown in FIGS. 7 and 8, a mechanism 10' for converting oscillatory rotation of an input shaft 12' to unidirectional rotation of an output shaft 14 constitutes an alternative embodiment of this invention. In FIGS. 7 and 8, primed reference numbers are used to designate elements similar to elements designated by similar, unprimed reference numbers in FIGS. 1 through 6. Except as illustrated and described herein, the mechanism 10' is similar to the mechanism 10.

Thus, the mechanism 10' comprises an input shaft 12' similar to the input shaft 12 except for pawl-receiving sockets to be later described, an output shaft 14' similar to the output shaft 14, and an actuating handle 26' similar to the actuating handle 26. The actuating handle 26 is pivotable between a first limiting position, which defines a first limiting position of the input shaft 12', and a second limiting position, which define a second limiting position of the input shaft 12'. A pin 28', which is similar to the pin 28, is secured to the input shaft 12' so as to extend radially from such shaft 12'. Two threaded studs 30', 32', similar to the threaded studs 30, 32, are secured to a frame (not shown) similar to the frame 16. The threaded studs 30', 32', and the pin 28' coact so as to limit rotation of the input shaft 12' to rotation within a range of approximately 180° between its first limiting position and its second limiting position.

The mechanism 10' comprises three bevel gears, namely a first gear 40', a second gear 42', and a third gear 44'. Each of the second gears 40', 42', is mounted around the input shaft 12' so as to permit relative rotation between such gear and the input shaft 12'. Thus, the first gear 40' has a circular, axial aperture, which is bounded by a cylindrical bearing surface 48' except for a pair of first recesses 50' in diametric opposition to each other, and through which a cylindrical portion 52' of the input shaft 12' extends. Also, the second gear 42' has a circular, axial aperture, which is bounded by a cylindrical bearing surface 56' except for a pair of second recesses 58', and through which a cylindrical portion 60' of the input shaft 12' extends. The third gear 44' is coupled to the output shaft 14' so as to enable conjoint rotation of the third gear 44' and the output shaft 14'. Thus, the third gear 44' has a noncircular, axial aperture, which conforms to an intermediate portion 24' of the output shaft 14', and through which such portion 24' of the output shaft 14' extends, so as to couple the third gear 44' to the output shaft 14'. The third gear 44' is intermeshed with the first gear 40' and with the second gear 42'.

The cylindrical portion 52' of the input shaft 12" has a pair of generally radial, diametrically opposed first sockets 72', which open at the cylindrical bearing surface 48' of the first gear 40'. The sockets 72' are shallower than the socket 72 but are similar to the socket 72 in other respects. The cylindrical portion 60' of the input shaft 12 has a pair of generally radial, diametrically opposed second sockets 74', which open at the cylindrical bearing surface 56' of the second gear 42'. The sockets 74' are shallower than the socket 74 but are similar to the socket 74 in other respects. The respective sockets 72', 74', are similar.

The mechanism 10' includes a pair of first pawls 80', which are carried by the input shaft 12' in a manner permitting each first pawl 80' to move between an operative position and an inoperative position. Each first pawl 80' has a tubular portion 82', which is disposed within an associated one of the first sockets 72' so as to permit generally radial movement of such first pawl 80' between an operative position and an inoperative position. Each first pawl 80' has an end portion 84', which extends from the associated socket 72' into a respective one of the first recesses 50' of the first gear 40, in the operative position of such first pawl 80'. The end portion 84' of each first pawl 80' does not extend into either of the first recesses 50' but bears against the cylindrical bearing surface 48' of the first gear 40 in the inoperative position of such first pawl 80'. Except that the tubular portions 82' of the first pawls 80' are shorter than the tubular portion 82 of the first pawl 80, the first pawls 80' are similar to the first pawl 80. A pair of coiled springs 86' are provided, which are similar to the coiled spring 86 except that the coiled springs 86' are shorter than the coiled spring 86. The coiled springs 86', each of which is seated in a respective one of the first sockets 72' so as to extend through the tubular portion 82' of the first pawl 80' therein and bears against the end portion 84' thereof, bias the first pawls 80' toward their operative positions, against such bearing surface 48 so as to permit relative movement of the first gear 40' and the first pawls 80' except in the operative positions of the first pawls 80'. Thus, in their operative positions, the first pawls 80' couple the first gear 40' to the input shaft 12' so as to enable conjoint rotation of the first gear 40' and the input shaft 12' only in a rotational direction (counterclockwise in the drawings) corresponding to rotation of the input shaft 12' toward its second limiting position.

The mechanism 10' includes a pair of second pawls 90', which are carried by the input shaft 12' in a manner permitting each second pawl 90' to move between an operative position and an inoperative position. Each second pawl 90' has a tubular portion 92', which is disposed within an associated one of the second sockets 74' so as to permit generally radial movement of such second pawl 90' between an operative position and an inoperative position. Each second pawl 90' has an end portion 94', which extends from the associated socket 72' into a respective one of the second recesses 58' of the second gear 42', in the operative position of such second pawl 90'. The end portion 94' of each second pawl 90, does not extend into either of the first recesses 50' but bears against the cylindrical bearing surface 56' of the second gear 42' in the inoperative position of such first pawl 80'. Except that the tubular portions 92' of the second pawls 90' are shorter than the tubular portion 92 of the second pawl 90, the second pawls 90' are similar to the first pawl 90. A pair of coiled springs 96' are provided, which are similar to the coiled spring 86 except that the coiled springs 86' are shorter than the coiled spring 86. The coiled springs 96', each of which is seated in a respective one of the second sockets 74' so as to extend through the tubular portion 92' of the second pawl 90' therein and bears against the end portion 94' thereof, bias the second pawls 90' toward their operative positions, against such bearing surface 56' so as to permit relative movement of the second gear 42' and the second pawls 90' except in the operative positions of the second pawls 90'. Thus, in their operative positions, the second pawls 90' couple the second gear 42' to the input shaft 12' so as to enable conjoint rotation of the second gear 42' and the input shaft 12' only in a rotational direction (clockwise in the drawings) corresponding to rotation of the input shaft 12' toward its first limiting position.

The first gear 40' has a pair of planar camming surfaces 100', each of which partly bounds a respective one of the first recesses 50' of such gear 40'. The end portion 84' of each first pawl 80' has a planar camming surface 102', which is disposed so as to engage a respective one of the camming surfaces 100 in the operative position of such first pawl 80' The camming surfaces 100, 102, coact so as to cam each first pawl 80' from its operative position into its inoperative position upon relative rotation of the first gear 40' and the input shaft 12' in opposite rotational directions.

The second gear 42' has a pair of planar camming surfaces 110', each of which partly bounds a respective one of the second recesses 58' of such gear 42'. The end portion 94' of each second pawl 90' has a planar camming surface 112', which is disposed so as to engage a respective one of the camming surfaces 110' in the operative position of such second pawl 90'. The camming surfaces 110', 112', coact so as to cam each second pawl 90' from its operative position into its inoperative position upon relative rotation of the second gear 42' and the input shaft 12' in opposite rotational directions.

In the mechanism 10', the first pawls 80' are arranged for tandem operation, and the second pawls 90' are arranged for tandem operation. In other respects, each operating cycle of the mechanism 10' is similar to each operating cycle of the mechanism 10, as described above. If high torque is encountered, the mechanism 10' is preferable over the mechanism 10.

Accordingly, the improved mechanisms provided by this invention offer significant advantages over mechanisms known heretofore for converting oscillatory rotation of an input shaft to unidirectional rotation of an output shaft, particularly but not exclusively if employed in a strapping tool.

Various modifications may be made in the improved mechanisms described above without departing from the scope and spirit of this invention.

I claim:

1. A mechanism for converting oscillatory rotation of an input shaft to unidirectional rotation of an output shaft, the mechanism comprising
   (a) a frame,
   (b) an input shaft journalled to the frame, the input shaft defining an input axis and being rotatable about the input axis,
   (c) an output shaft journalled to the frame, the output shaft defining an output axis and being rotatable about the output axis, the output axis being normal to the input axis,
   (d) bevel gears including a first gear mounted around the input shaft so as to permit relative rotation between the first gear and the input shaft, a second gear mounted around the input shaft so as to permit relative rotation between the second gear and the input shaft, and a third gear coupled to the output shaft so as to enable conjoint rotation of the third gear and the output shaft, the first and second gears being spaced axially from each other along the input shaft, the third gear being intermeshed with each of the first and second gears, (e) means including a first pawl, which is movable between an operative position and an inoperative position, for coupling the first gear to the input shaft so as to enable conjoint rotation of the first gear and the input shaft over a range of approximately 180° in the operative position of the first pawl and for decoupling the first gear from the input shaft so as to permit relative rotation between the first gear and the input shaft over said range in the inoperative position of the first pawl, (f) means including a second pawl, which is movable between an operative position and an inoperative position, for coupling the second gear to the input shaft so as to enable conjoint rotation of the second gear and the input shaft over said range in the operative position of the second pawl and for decoupling the second gear from the input shaft so as to permit relative rotation between the second gear and the input shaft over said range in the inoperative position of the second pawl.

2. A mechanism for converting oscillatory rotation of an input shaft to unidirectional rotation of an output shaft, the mechanism comprising (a) a frame, (b) an input shaft journalled to the frame, the input shaft defining an input axis and being rotatable about the input axis, (c) an output shaft journalled to the frame, the output shaft defining an output axis and being rotatable about the output axis, the output axis being normal to the input axis, (d) bevel gears including a first gear mounted around the input shaft so as to permit relative rotation between the first gear and the input shaft, a second gear mounted around the input shaft so as to permit relative rotation between the second gear and the input shaft, and a third gear coupled to the output shaft so as to enable conjoint rotation of the third gear and the output shaft, the first and second gears being spaced axially from each other along the input shaft, the third gear being intermeshed with each of the first and second gears, the first gear having a bearing surface, which is smooth except for a single recess, the second gear having a bearing surface, which is smooth except for a single recess, (e) means including a first pawl, which is mounted to the input shaft in a manner permitting the first pawl to move between an operative position wherein the first pawl extends into the single recess of the first gear and an inoperative position wherein the first pawl is withdrawn from the single recess of the first gear and which is biased toward its operative position, for coupling the first gear to the input shaft so as to enable conjoint rotation of the first gear and the input shaft in the operative position of the first pawl and for decoupling the first gear from the input shaft so as to permit relative rotation between the first gear and the input shaft in the inoperative position of the first pawl, and the first pawl being biased against the bearing surface of the first gear so as to permit relative movement between the first gear and the first pawl except in the operative position of the first pawl, (f) means including a second pawl, which is mounted to the input shaft in a manner permitting the second pawl to move between an operative position wherein the second pawl extends into the single recess of the second gear and an inoperative position wherein the second pawl is withdrawn from the single recess of the second gear and which is biased toward its operative position, for coupling the second gear to the input shaft so as to enable conjoint rotation of the second gear and the input shaft in the operative position of the second pawl and for decoupling the second gear from the input shaft so as to permit relative rotation between the second gear and the input shaft in the inoperative position of the second pawl, the second pawl being biased against the bearing surface of the second gear so as to permit relative movement of the second gear and the second pawl except in the operative position of the second pawl.

3. The mechanism of claim 2 wherein the first gear has a camming surface and the first pawl has a camming surface, which engages the camming surface of the first gear in the operative position of the first pawl, wherein the camming surface of the first gear and the camming surface of the first pawl constitute means for camming the first pawl from its operative position into its inoperative position upon relative rotation of the first gear and the input shaft in opposite rotational directions, wherein the second gear has a camming surface and the second pawl has a camming surface, which engages the camming surface of the second gear in the operative position of the second pawl, and wherein the camming surface of the second gear and the camming surface of the second pawl constitute means for camming the second pawl from its operative position into its inoperative position upon relative rotation of the second gear and the input shaft in opposite rotational directions.

4. The mechanism of claim 2 comprising (g) means for limiting rotation of the input shaft to rotation within a range of approximately 180° between a first limiting position wherein the first pawl can move from its inoperative position into its operative position and a second limiting position wherein the second pawl can move from its inoperative position into its operative position.

5. The mechanism of claim 4 wherein the first gear has a camming surface and the first pawl has a camming surface, which engages the camming surface of the first gear in the operative position of the first pawl, wherein the camming surface of the first gear and the camming surface of the first pawl constitute means for camming the first pawl from its operative position into its inoperative position upon relative rotation of the first gear and the input shaft in opposite rotational directions, wherein the second gear has a camming surface and the second pawl has a camming surface, which engages the camming surface of the second gear in the operative position of the second pawl, and wherein the camming surface of the second gear and the camming surface of the second pawl constitute means for camming the second pawl from its operative position into its inoperative position upon relative rotation of the second gear and the input shaft in opposite rotational directions.

6. The mechanism of claim 3 wherein each gear has an axial aperture, through which the input shaft extends, which is bounded by the bearing surface of such gear except for the single recess of such gear, and into which the single recess of such gear opens, wherein the input shaft has a first, generally radial socket, in which the first pawl is disposed so as to permit generally radial movement of the first pawl between its inoperative position and its operative position, and a second, generally radial socket, in which the second pawl is disposed so as to permit generally radial movement of the second pawl between its inoperative position and its operative position.

7. The mechanism of claim 5 comprising, in each socket of the input shaft, means including a coiled spring for biasing the pawl disposed in such socket toward its operative position.

8. A mechanism for converting oscillatory rotation of an input shaft to unidirectional rotation of an output shaft, the mechanism comprising
(a) a frame,
(b) an input shaft journalled to the frame, the input shaft defining an input axis and being rotatable about the input axis,
(c) an output shaft journalled to the frame, the output shaft defining an output axis and being rotatable about the output axis, the output axis being normal to the input axis,
(d) bevel gears including a first gear mounted around the input shaft so as to permit relative rotation between the first gear and the input shaft, a second gear mounted around the input shaft so as to permit relative rotation between the second gear and the input shaft, and a third gear coupled to the output shaft so as to enable conjoint rotation of the third gear and the output shaft, the first and second gears being spaced axially from each other along the input shaft, the third gear being intermeshed with each of the first and second gears, the first gear having a bearing surface, which is smooth except for a pair of first recesses in diametric opposition to each other, the second gear having a bearing surface, which is smooth except for a pair of second recesses in diametric opposition to each other,
(e) means including a pair of first pawls, which are mounted to the input shaft in diametric opposition to each other in a manner permitting each first pawl to move between an operative position wherein such first pawl extends into a respective one of the first recesses and an inoperative position wherein such first pawl does not extend into either first recess and each of which is biased toward its operative position, for coupling the first gear to the input shaft so as to enable conjoint rotation of the first gear and the input shaft in the operative positions of the first pawls and for decoupling the first gear from the input shaft so as to permit relative rotation between the first gear and the input shaft in the inoperative positions of the first pawls, the first pawls being biased against the bearing surface of the first gear so as to permit relative movement between the first gear and the first pawls except in the operative positions of the first pawls,
(f) means including a pair of second pawls, which are mounted to the input shaft in diametric opposition to each other in a manner permitting each second pawl to move between an operative position wherein such second pawl extends into a respective one of the second recesses and an inoperative position wherein such second pawl does not extend into either second recess and each of which is biased toward its operative position, for coupling the second gear to the input shaft so as to enable conjoint rotation of the second gear and the input shaft in the operative positions of the second pawls and for decoupling the second gear from the input shaft so as to permit relative rotation between the second gear and the input shaft in the inoperative positions of the second pawls, the second pawls being biased against the bearing surface of the second gear so as to permit relative movement of the second gear and the second pawls except in the operative positions of the second pawls.

9. The mechanism of claim 8 wherein the first gear has a pair of camming surfaces and each first pawl has a camming surface, which engages a respective one of the camming surfaces of the first gear in the operative position of such first pawl, wherein the camming surfaces of the first gear and the camming surfaces of the first pawls constitute means for camming the first pawls from their operative positions into their inoperative positions upon relative rotation of the first gear and the input shaft in opposite rotational directions, wherein the second gear has a pair of camming surfaces and each second pawl has a camming surface, which engages a respective one of the camming surfaces of the second gear in the operative positions of the second pawls, and wherein the camming surfaces of the second gear and the camming surfaces of the second pawls constitute means for camming the second pawls from their operative positions into their inoperative position upon relative rotation of the second gear and the input shaft in opposite rotational directions.

10. The mechanism of claim 8 comprising
(g) means for limiting rotation of the input shaft to rotation within a range of approximately 180° between a first limiting position wherein each first pawl can move from its inoperative position into its operative position and a second limiting position wherein each second pawl can move from its inoperative position into its operative position.

11. The mechanism of claim 10 wherein the first gear has a pair of camming surfaces and each first pawl has a camming surface, which engages a respective one of the camming surfaces of the first gear in the operative position of such first pawl, wherein the camming surfaces of the first gear and the camming surfaces of the first pawls constitute means for camming the first pawls from their operative positions into their inoperative positions upon relative rotation of the first gear and the input shaft in opposite rotational directions, wherein the second gear has a pair of camming surfaces and each second pawl has a camming surface, which engages a respective one of the camming surfaces of the second gear in the operative positions of the second pawls, and wherein the camming surfaces of the second gear and the camming surfaces of the second pawls constitute means for camming the second pawls from their operative positions into their inoperative positions upon relative rotation of the second gear and the input shaft in opposite rotational directions.

12. The mechanism of claim 9 wherein each gear has an axial aperture, through which the input shaft extends, which is bounded by the bearing surface of such gear except for the recesses of such gear, and into which the recesses of such gear opens, wherein the input shaft has a first pair of generally radial sockets, in a respective one of which each first pawl is disposed so as to permit generally radial movement of such first pawl between its inoperative position and its operative position, and a second pair of generally radial sockets, in a respective one of which each second pawl is disposed so as to permit generally radial movement of such second pawl between its inoperative position and its operative position.

13. The mechanism of claim 11 comprising, in each socket of the input shaft, means including a coiled spring for biasing the pawl disposed in such socket toward its operative position.

* * * * *